BEST AVAILABLE COPY

JAMES HARRIS.

Improvement in Cultivators.

No. 4,812. Reissued March 19, 1872.

Witnesses.
C. F. Brown.
Benj. W. Lacey

Inventor.
James Harris by
H. W. Beadle, atty.

AM. PHOTO-LITHOGRAPHIC CO. N.Y. (OSBORNE'S PROCESS.)

UNITED STATES PATENT OFFICE.

JAMES HARRIS, OF JANESVILLE, WISCONSIN.

IMPROVEMENT IN CULTIVATORS.

Specification forming part of Letters Patent No. 87,101, dated February 23, 1869; reissue No. 4,812, dated March 19, 1872.

DIVISION A.

*To all whom it may concern:*

Be it known that I, JAMES HARRIS, of the city of Janesville, in the county of Rock and State of Wisconsin, have invented certain new and useful Improvements in Cultivators; and I do hereby declare that the following is a full, clear, and exact description thereof, reference being had to the accompanying drawing making a part of this specification, in which—

Figure 1:
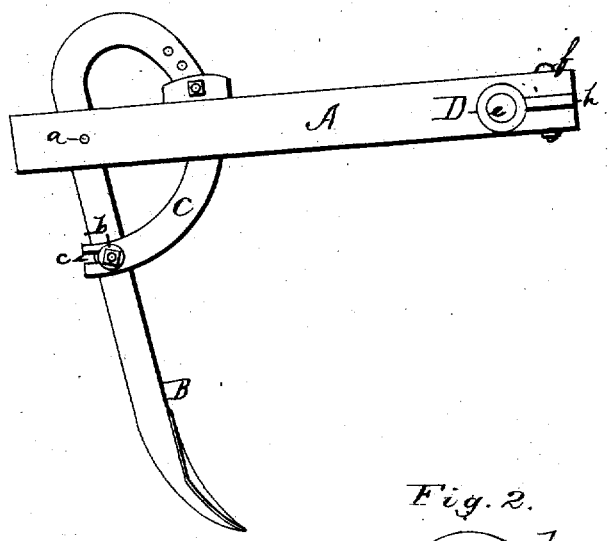
Figure 3:
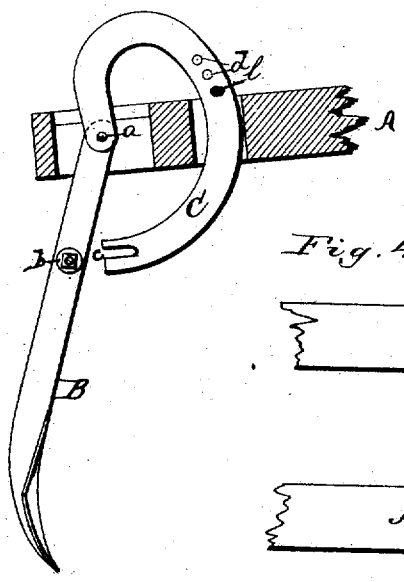
Figure 2:
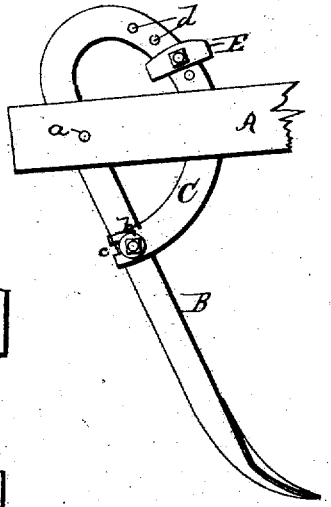
Figure 4:
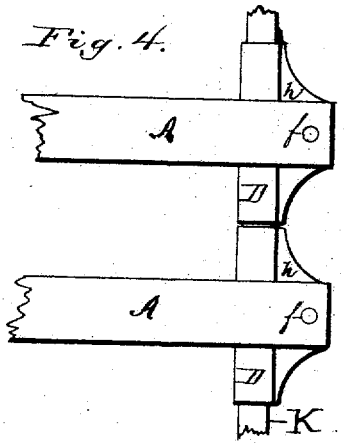

Figure 1 is a side view or elevation of the "drag-bar" and tooth or shovel of a cultivator as I construct them, and as they appear when in use. Fig. 2 is also a side view or elevation of the same as they appear when the cultivator is "backing." Fig. 3 is a longitudinal vertical section of the same as they appear when the tooth has been released by coming in contact with an obstruction; and Fig. 4 is a top view of a portion of the drag-bars, showing their position in connection with the "draft-rod."

The nature of my invention relates to the teeth and drag-bars of cultivators; and consists, first, in connecting the shank of the tooth to an independent circle-iron, when constructed and used in connnection with the drag-bar, substantially as and for the purpose hereinafter described. Second, in joining the drag-bar to the "draft-rod" by means of an elongated metallic box bearing, substantially as and for the purpose hereinafter described.

To enable others skilled in the art to make and use my invention, I will proceed to describe its construction and operation.

In the drawing, A represents a drag-bar, of wood or any other suitable material; B, the tooth; C, the circle-iron; and D, the elongated metallic box, joining the drag-bar A to the draft-rod K, Fig. 4. The tooth at the end of the shank, and the circle-iron at its upper end, have a common bearing on the pivot-pin *a*, that passes through the drag-bar. The lower end of the circle-iron is joined to the shank of the tooth by a safety-coupling, *b*. This safety-coupling consists of a simple bolt passing through the shank, and also a slot, *c*, in the circle-iron. On the end of the bolt is a washer, larger than the width of the slot, and a nut to clamp them together. The bolt and nut may be in the circle-iron, and the slot in a flange or short ear on the shank, if desired, or a bolt-staple in the shank clasping around the circle-iron, and dispensing with the slot, may be used. To set the teeth or give them the desired "pitch" or inclination, I pierce the circle-iron with a series of holes, *d*, through either of which the setting device E may be secured. This setting device may consist of the bolt and square-faced lugs, as shown, or of the simple pin *l*, shown in Fig. 3. In the latter case the upper face of the drag-bar (if of wood) should be covered with a metallic plate to prevent the pin from indenting the wood. The elongated box bearing D should be of cast-iron of the form shown, in which case the forward end of the drag-bar should be slotted to receive it, and the same secured therein by a bolt, *f*, passing through the flange *h*. The box is bored or cast with orifice *e*, so as to nicely fit on the draft-rod *k*, Fig. 4, and extends beyond the drag-bar on either side, one-half of the width of the space between the bars. The position of the drag-bars on the draft-rod and the office of the elongated box bearing are shown in Fig. 4.

As heretofore joined to the draft-rod it has been impossible to keep the drag-bars (and teeth) in line, as, owing to their short bearing on the draft-rod, they were constantly swinging and swaying sidewise. As heretofore constructed, it has been the custom, in order to keep the bars the proper distance apart to fill the space between them on the draft-rod with washers. To avoid the use of washers and to keep them securely in line by giving them a broad, firm bearing on the rod, I employ the elongated metallic box described.

It is not essential to my invention that the box D should be inserted in a slot in the drag-bar, as the same results may be accomplished by bolting it underneath or on top of the bar, or by constructing it in sections and bolting them upon the sides thereof. It will be seen that the adjustable setting device E secures without change, when once set, the pitch or inclination of the teeth, and allows them to swing forward, as shown in Fig. 2, when the cultivator is backed. It will also be seen that the safety-coupling *b* holds the teeth with an adjustable force, and when once the tooth is drawn back by an obstruction, the short distance necessary to withdraw the bolt from the slot *c*, the tooth is not still held by the coupling, but is entirely free; also, that the freeing or loosening of the tooth does not affect the previous setting of its pitch or inclination, which remains unchanged, however often the tooth may be loosened.

What I claim is—

1. A wooden drag-bar, provided with a metallic bearing box, secured by means substantially as described, for the purpose set forth.

2. A drag-bar, provided with an orifice at one end, an elongated bearing box, and a securing bolt, for the purpose specified.

3. A drag-bar, provided with an orifice and slot at one end, an elongated bearing box and securing bolt, for the purpose specified.

4. The combination of the drag-bar A, having an orifice and slot, as described, with box D having the flange, as and for the purpose set forth.

This specification signed and witnessed this 6th day of September, 1871.

JAMES HARRIS.

Witnesses:
L. L. ROBINSON,
OBED DANN.